US008008516B2

(12) United States Patent  (10) Patent No.: US 8,008,516 B2
Cantrell et al.  (45) Date of Patent: *Aug. 30, 2011

(54) METHOD OF PROCESSING ETHANOL BYPRODUCTS AND RELATED SUBSYSTEMS

(76) Inventors: David Fred Cantrell, Lakemont, GA (US); David J. Winsness, Alpharetta, GA (US)

( * ) Notice: Subject to any disclaimer, the term of this patent is extended or adjusted under 35 U.S.C. 154(b) by 662 days.

This patent is subject to a terminal disclaimer.

(21) Appl. No.: 11/241,231

(22) Filed: Sep. 30, 2005

(65) Prior Publication Data

US 2006/0041153 A1  Feb. 23, 2006

Related U.S. Application Data

(63) Continuation of application No. 11/122,859, filed on May 5, 2005, now Pat. No. 7,601,858.

(60) Provisional application No. 60/602,050, filed on Aug. 17, 2004.

(51) Int. Cl.
C11B 1/00  (2006.01)
(52) U.S. Cl. .......................................... 554/8
(58) Field of Classification Search .................. 554/8
See application file for complete search history.

(56) References Cited

U.S. PATENT DOCUMENTS

| | | | |
|---|---|---|---|
| 313,665 A | 11/1884 | Greene |
| 365,120 A | 6/1887 | DeLaval |
| 445,066 A | 1/1891 | DeLaval |
| 1,310,977 A | 7/1919 | Barton |
| 1,366,339 A | 1/1921 | Alexander |
| 2,206,024 A | 7/1940 | Brown |
| 2,216,904 A | 10/1940 | Brown |
| 2,216,905 A | 10/1940 | Brown et al. |
| 2,263,608 A | 11/1941 | Brown |
| 2,439,177 A | 1/1946 | Manning |
| 2,446,913 A | 8/1948 | Erlich |
| 2,524,718 A | 10/1950 | Stark |
| 2,615,029 A | 10/1952 | Rosten |
| 2,663,718 A | 12/1953 | Strezynski |
| 2,929,150 A | 3/1960 | Johnston |
| 3,061,622 A | 10/1962 | Fiala |
| 3,451,990 A | 6/1969 | Sole, Jr. |
| 3,460,751 A | 8/1969 | Hemfort, Sr. |
| 3,721,568 A | 3/1973 | Wilson |
| 3,931,258 A | 1/1976 | Lake |

(Continued)

FOREIGN PATENT DOCUMENTS

DE  80874  5/1971

(Continued)

OTHER PUBLICATIONS

Singh, et al., "Extraction of Oil from Corn Distillers Dried Grains with Solubles", 1998, Transactions of the ASAE, Bol. 41(6), pp. 1175 and 1176.*

(Continued)

*Primary Examiner* — Deborah D Carr (57) ABSTRACT

In one aspect of the invention, a method recovers oil from a concentrated byproduct, such as evaporated thin stillage formed during a dry milling process used for producing ethanol. The method includes forming a concentrate from the byproduct and recovering oil from the concentrate. The step of forming the concentrate may comprise evaporating the byproduct. Further, the step of separating the oil from the concentrate may comprise using a centrifuge and, in particular, a disk stack centrifuge. Other aspects of the invention include related methods and subsystems for recovering oil from thin stillage.

11 Claims, 4 Drawing Sheets

U.S. PATENT DOCUMENTS

| | | | |
|---|---|---|---|
| 3,950,230 | A | 4/1976 | Greenfield et al. |
| 4,061,568 | A | 12/1977 | Hall |
| 4,105,553 | A | 8/1978 | Oldham |
| 4,137,335 | A | 1/1979 | Holm et al. |
| 4,163,009 | A | 7/1979 | Filstrup |
| 4,216,239 | A | 8/1980 | Gloppestad |
| 4,270,974 | A | 6/1981 | Greenfield et al. |
| 4,341,713 | A | 7/1982 | Stolp et al. |
| 4,381,220 | A | 4/1983 | Standiford |
| 4,407,955 | A | 10/1983 | Muller et al. |
| 4,425,239 | A | 1/1984 | Jacocks et al. |
| 4,532,144 | A | 7/1985 | Vernet |
| 4,593,614 | A | 6/1986 | Berge et al. |
| 4,619,789 | A | 10/1986 | Strop et al. |
| 4,662,990 | A | 5/1987 | Bonanno |
| 4,812,225 | A | 3/1989 | Corti et al. |
| 4,944,954 | A | 7/1990 | Strop et al. |
| 4,952,504 | A | 8/1990 | Pavilon |
| 5,113,755 | A | 5/1992 | Anderson et al. |
| 5,250,182 | A | 10/1993 | Bento et al. |
| 5,256,251 | A | 10/1993 | Holcombe |
| 5,269,947 | A | 12/1993 | Baskis |
| 5,278,325 | A | 1/1994 | Strop et al. |
| 5,316,782 | A | 5/1994 | Zimlich, III |
| 5,439,701 | A | 8/1995 | Zimlich, III |
| 5,662,810 | A | 9/1997 | Willgohs |
| 5,801,140 | A | 9/1998 | Langley et al. |
| 5,958,233 | A | 9/1999 | Willgohs |
| 5,980,754 | A | 11/1999 | Hopkins et al. |
| 5,998,641 | A | 12/1999 | Ganguli et al. |
| 6,106,673 | A | 8/2000 | Walker |
| 6,106,678 | A | 8/2000 | Shufflebotham et al. |
| 6,143,532 | A | 11/2000 | Wenzel et al. |
| 6,146,645 | A | 11/2000 | Deckers et al. |
| 6,214,236 | B1 | 4/2001 | Scalliet |
| 6,433,146 | B1 | 8/2002 | Cheryan |
| 6,726,941 | B2 | 4/2004 | Ethington, Jr. et al. |
| 6,761,914 | B2 | 7/2004 | Deckers et al. |
| 7,297,236 | B1 | 11/2007 | Griend |
| 7,431,952 | B2 | 10/2008 | Bijl et al. |
| 7,572,627 | B2 | 8/2009 | Rieke et al. |
| 7,601,858 | B2 | 10/2009 | Cantrell et al. |
| 2003/0093832 | A1 | 5/2003 | Szarka et al. |
| 2003/0180415 | A1 | 9/2003 | Stiefel et al. |
| 2004/0081654 | A1 | 4/2004 | Schryvers et al. |
| 2004/0082044 | A1 | 4/2004 | Prevost et al. |
| 2004/0087808 | A1* | 5/2004 | Prevost et al. ............ 554/9 |

FOREIGN PATENT DOCUMENTS

| | | |
|---|---|---|
| DE | 19547866 C1 | 4/1997 |
| FR | 1568774 | 4/1969 |
| GB | 1070128 | 5/1967 |
| GB | 1200672 | 7/1970 |
| GB | 2007205 A | 8/1978 |
| JP | 54064683 | 5/1979 |

OTHER PUBLICATIONS

Yokoyama, et al. "Liquid Fuel Production from Ethanol Fermentation Stillage" 1986, The Chemical Society of Japan, pp. 649-652.*

Minowa, T. et al., Oil Production form Buchwheat Stillage by Thermochemical Liquefactional, 1993, national Inst. for Resources and Environment, Ibaraki (Japan), STN, Abstract, NTIS database.*

N. Singh and M. Cheryan, Extraction of Oil from Corn Distillers Dried Grains with Solubles, Transactions of the ASAE, 1998, pp. 1775-1777, vol. 41(6).

Y. Dote et al., Liquefaction of Stillage from Ethanolic Fermentation and Upgrading of Liquefied Oil, Trans. Mat. Res. Soc. Jpn., 1994, pp. 285-288, vol. 18A.

(No Author Available), "Thermochemical Liquefaction", article by Wisconsin Biorefining Development Initiative, www.wisbiorefine.org, p. 1-4, undated.

"Disc Stack Centrifuges" Alfa Laval website, www.alfalaval.com, Aug. 3, 2004.

Alfa Laval, "NS 934 DD Decanter," PFT00017EN 0207, PFT00018EN 0207, PFT00007EN 0207, 6 pages.

(No Author Available) "Thermochemical Liquefaction" article by Wisconsin Biorefining Development Initiative, www.wisbiorefine.org, p. 1-4, undated.

International search Report dated Mar. 11, 2008.

International Search Report dated Aug. 20, 2008.

McIntyre, Craig., "Measurement solutions for Ethanol Producers", A white paper by Endress+Hauser, Inc., Copyright 2003, pp. 1-10.

Jacques et al. "The Alcohol Textbook" 3rd Edition, published 1999, Part 1 of 4 Parts, 53 pgs.

Jacques, et al., "The Alcohol Textbook", 3rd Edition, published 1999, Part 2 of 4 Parts, 50 pgs.

Jacques, et al., "The Alcohol Textbook", 3rd Edition, published 1999, Part 3 of 4 Parts, 50 pgs.

Jacques, et al., "The Alcohol Textbook", 3rd Edition, published 1999, Part 4 of 4 Parts, 42 pgs.

GEA Westfalia Separator, Inc. v Greenshift Corporation, Complaint, Case No. 1:09-cv-07686-LMM; filed Sep. 3, 2009, pp. 1-28, stamped by Judge McKenna.

GEA Westfalia Separator, Inc. and Ace Ethanol, LLC v. Greenshift Corporation, Case No. 09 Civ. 7686 (LMM) ECF Case, First Amended Complaint, received in U.S. District Court S.D.N.Y, Oct. 13, 2009, pp. 1-36.

GS Cleantech Corporation v. GEA Westfalia Separator, Inc.; Ace Ethanol, LLC; ICM, Inc.; Lifeline Foods LLC; and Does 1-30, Inclusive, First Amended Complaint for Patent Infringement; Civil Action No. 09-cv-08642-SAS, filed Oct. 23, 2009, pp. 1-11.

GS Cleantech Corporation v. GEA Westfalia Separator, Inc.; and Does 1-20, Inclusive; Complaint, Case No. 1:09-cv-08642-LMM; filed Oct. 13, 2009, pp. 1-8.

ICM, Inc. v. GS Cleantech Corporation Greenshift Corporation, Complaint for Declaratory Judgement, Civil Action No. 09-1315-WEB-KMH, filed Oct. 13, 2009, pp. 1-6.

Tjardes, Kent et al., "Feeding Corn Distiller's Co-Products to Beef Cattle", Cooperative Extension Services, Extension Extra, ExEx 2036, Animal & Range Sciences, College of Agriculture & Biological Sciences/South Dakota State University/USDA, Aug. 2002, 5 pgs.

Final Office Action; U.S. Appl. No. 11/856,150; Filing Date: Sep. 17, 2007; First Named Inventor: David J. Winsness; Mail Date: Feb. 22, 2010.

Final Office Action, U.S. Appl. No. 11/122,859; Filing Date: May 5, 2005; First Named Inventor: David Fred Cantrell; Mail Date: Dec. 22, 2008.

GS Cleantech Corporation, Plaintiff v. Big River Resources Galva, LLC and Big River Resources West Burlington, LLC, Defendants; "Complaint"; filed in the United States District Court for the Northern District of Illinois, Eastern Division, on Feb. 21, 2010, Document 1; Case 1:10-cv-0090; 9 pgs.

GS Cleantech Corporation, Plaintiff v. Big River Resources Galva, LLC and Big River Resources West Burlington, LLC, Defendants; "Motion for Preliminary Injunction"; filed in the United States District Court for the Northern District of Illinois, Eastern Division, Case No. 10-990, on Feb. 15, 2010, Document 6; Case 1:10-cv-0090, 2 pgs.

GS Cleantech Corporation, Plaintiff v. Big River Resources Galva, LLC and Big River Resources West Burlington, LLC, Defendants, "Plaintiff's Memorandum of Law in Support of Its Motion for Preliminary Injunction" (with Exhibits 8, 8-1 through 8-8 inclusive), filed in the United States District Court for the Northern District of Illinois Easter Division, Case No. 10-990, on Feb. 15, 2010, Document 7, Case 1:10-cv-0090, 401 pgs.

GS Cleantech Corporation, Plaintiff, v. Cardinal Ethanol, LLC, Defendant, "Complaint for Patent Infringement", filed in United State District Court for the Southern District of Indianapolis Division, Civil Action No. 1:10-cv-0180LJM-DML; on Feb. 10, 2010; Document 1; Case No. 1:10-cv-00180-LJM-DML, 9 pgs.

GS Cleantech Corporation, Plaintiff, v. Cardinal Ethanol, LLC, Defendant, "Motion for Preliminary Injunction"; filed in United State District Court for the Southern District of Indiana, Indianapolis Division, Civil Action No. 1:10-cv-0180- LJM-DML, on Feb. 10, 2010, Document 7, Case no. 1:10-cv-00180-LJM-DML, 2 pgs.

GS Cleantech Corporation, Plaintiff, v. Cardinal Ethanol, LLC, Defendant; "Plaintiff's Reply Brief in Support of Its Motion for Preliminary Injunction" (with Exhibits 32 and 32-1); filed in United States District Court for the Southern District of Indiana, Indianapolis Division, Civil Action No. 1:10-cv-0180-LJM-DML, on Apr. 5, 2010; Document 31, Case 1:10-cv-0180-LJM-DML, 25 pgs.

GS Cleantech Corporation, Plaintiff, v. Cardinal Ethanol, LLC, Defendant; "Plaintiffs Memorandum of Law in Support of its Motion for Preliminary Injunction" (with Exhibits 9-1 through 9-15 inclusive), filed in United States District Court Southern District of Indiana, Indianapolis Division, Civil Action No. 1:10-cv-0180LJM-DML, on Feb. 11, 2010, Document 9, Case No. 1:10-cv-00180-LJM-DML, 456 pgs.

GS Cleantech Corporation, Plaintiff, v. Cardinal Ethanol, LLC, Defendant, "Defendants Memorandum of Law in Opposition to Plaintiffs Motion for Preliminary Injunction" (with Exhibits 26-1 through 26-24 inclusive), Civil Action No. 1:10-cv-0180 LJM-DML; filed in United States District Court Southern District of Indiana Indianapolis Division, on Mar. 24, 2010, Document 26, Case 1:10-cv-00180-LJM-DML, 306 pgs.

GS Cleantech Corporation, Plaintiff, v. GEA Westfalia Separator, Inc.; Ace Ethanol, LLC; ICM, Inc.; Lifeline Foods LLC; and DOES 1-30, Inclusive, Defendants, " Gea Westfalia Separator, Inc.'s Answer to Plaintiffs First Amended Complaint for Patent Infringement", filed in United States District Court for the Southern District of New York, Civil Action No. 09- cv-08642-LMM: on Nov. 18, 2009, Document 21, Case 1:09-cv-08642-Lmm, 9 pgMM GS Cleantech Corporation, Plaintiff, v. GEA Westfalia Separator, Inc.; Ace Ethanol, LLC; ICM, Inc.; Lifeline Foods LLC; and DOES 1-30, Inclusive, Defendant; "First Amended Complaint for Patent Infringement"; filed United States District Court for the Southern District of New York, Civil Action No. 09-cv-08642-SAS, on Oct. 15, 2009, Document 3-2; Case 1:09-cv-08642-LMM, 11 pgs.

GS Cleantech Corporation, Plaintiff, v. GEA Westfalia Separator, Inc.; Ace Ethanol, LLC; ICM, Inc.; Lifeline Foods LLC; and DOES 1-30, Inclusive, Defendants; "Ace Ethanol, LLC's Answer to Plaintiffs First Amended Complaint for Patent Infringement" filed in United States District Court for the Southern District of New York; Civil Action No. 09- cv-08642-LMM, filed on Nov. 18, 2009, Document 19; Case 1:09-cv-08642-LMM, 9 pgs.

ICM, Inc., KMH, Plaintiff v. GS Cleantech Corporation-Greenshift Corporation, Defendant; "First Amended Complaint for Declaratory Judgment"; filed in United States District Court, District of Kansas, Civil Action No. 09-1315-WEB-, on Nov. 14, 2009, Document 4; Case 6:09-cv-01315-WEB-KMH; 6 pgs.

Non-Final Office Action, U.S. Appl. No. 11/908,891, Filing Date: Sep. 17, 2007; First Named Inventor: David J. Winsness; Mail Date: Jan. 21, 2010.

Non-Final Office Action; U.S. Appl. No. 11/122,859; Filing Date: May 5, 2005; First Named Inventor: David Fred Cantrell; Mail Date: Jun. 13, 2008.

Non-Final Office Action; U.S. Appl. No. 11/688,425; Filing Date: Mar. 20, 2007; First Named Inventor: David J. Winsness; Mail Date: Aug. 1, 2008.

Non-Final Office Action, U.S. Appl. No. 11/688,425; Filing Date: Mar. 20, 2007; First Named Inventor: David J. Winsness; Mail Date: Oct. 31, 2007.

Notice of Allowance; U.S. Appl. No. 11/688,425; Filing Date: Mar. 20, 2007; First Named Inventor: David J. Winsness; Mail Date: Mar. 5, 2009.

Notice of Allowance; U.S. Appl. No. 11/122,859, Filing Date: May 5, 2005; First Named Inventor: David Fred Cantrell; Mail Date: Apr. 8, 2009.

Notice of Allowance; U.S. Appl. No. 11/688,425, Filing Date: Mar. 20, 2007; First Named Inventor: David J. Winsness; Mail Date: Aug. 10, 2009.

Notice of Allowance U.S. Appl. No. 11/122,859, Filing Date: May 5, 2005; First Named Inventor: David Fred Cantrell; Mail Date: Aug. 25, 2009.

Notice of Allowance—Supplmental; U.S. Appl. No. 11/688,425; Filing Date: Mar. 20, 2007; First Named Inventor: David J. Winsness; Mail Date: Apr. 21, 2009.

Restriction/Election Office Action, U.S. Appl. No. 11/688,425; Filing Date: Mar. 20, 2007; First Named Inventor: David J. Winsness; Mail Date: Sep. 26, 2007.

Restriction/Election Office Action for U.S. Appl. No. 11/908,891, filed Sep. 17, 2007, Inventor David J. Winsness, mail date: Aug. 26, 2009.

Restriction/Election Office Action, U.S. Appl. No. 11/122,859; Filing Date: May 5, 2005; First Named Inventor: David Fred Cantrell; Mail Date: Jun. 13, 2008.

Declaration of David F. Cantrell for U.S. Appl. No. 11/241,231, with Exhibits A and B, dated Nov. 8, 2010.

Office Action-Non-Final for U.S. Appl. No. 12/559,136; Filing Date: Sep. 14, 2009; First Named Inventor: David Fred Cantrell; Mail Date: Jul. 6, 2010.

Office Action-Non-Final for U.S. Appl. No. 11/908,891; Filing Date: Sep. 17, 2007; First Named Inventor: David J. Winsness; Mail Date: Jul. 13, 2010.

Office Action-Non-Final for U.S. Appl. No. 11/856,150; Filing Date: Sep. 17, 2007; First Named Inventor: David J. Winsness; Mail Date: Aug. 13, 2010.

Bizimana, V., et al. "Avocado Oil Extraction with Appropriate Technology for Developing Countries" (JAOCS, vol. 70, No. 8 (Aug. 1993); ppp. 821-822.

Castellanos, et al. Abstract of "Extraction of Oil from Fresh Coconut"; Oleagineux 24 (7): 419-21-24 (8/9) 505-09, 1969; 1 page.

Committee on Animal Nutrition, Board on Agriculture and Renewable Resources; Commission on Natural Resources; National Research Counsel "Feeding Value of Ethanol Production By-products"; National Academy Press, Washington, D.C. 1981; 80 pages.

Davis, Kelly S., "Corn Milling, Processing and Generation of Co-Products", Nutrition Conference—Minnesota Corn Growers Association, Technical Symposium, Sep. 11, 2001; 7 pgs.

Food and Agriculture Organization of the United Nations/FAO, Fishery Industries Division, "The Production of Fish Meal and Oil"; Fao Fish. Tech. Pap (142) Rev. 1; (1986); 80 pgs.

Gupta, R., et al., "A Novel Approach to Process Crude Oil Membrane Concentrate Using a Centrifuge", Journal of the American Oil Chemists' Society, vol. 79, No. 5, (2002); pp. 419-423.

Hagenmeier et al. "Aqueous Processing of Fresh Coconuts for Recovery of Oil and Cocnut Skim Milk" Journal of Food Science, vol. 38, 1973, pp .516-518.

S.S. Koseoglu et al., "Aqueous, Membrane and Adsorptive Separations of Vegetable Proteins", Good Protein Research and Development Center, Texas Engineering Experiment Station, Texas A&M University System, 1989, pp. 528-547.

Lehmann, Hanno-R., et al. "Whey Processing Lines" Westfalia Separator AG, Technical Scientific Documentation No. 6, 3rd Rev. Ed., 1988, 6 pgs.

McAloon et al., "Determining the Cost of Producing Ethanol from Corn Starch and Lignocellulosic Feedstocks", Ntional Renewable Energy Laboratory, NL/TP-580-28893, Oct. 2000; 43 pgs.

RX The ProExporter Network "PRX Digest Grain Database"m constantly updated, 1 pg., 2009.

Chicago Board of Trade, "Chicago Board of Trade (CBOT) SoyBean Oil Prices" graph, constantly updated, 1 pg., 2009.

Westfalia Separator Industry "Decanters and Separators for Industrial Fish Processing", 1999, 36 pages.

Westfalia Separator AG/Communication Westfalia Magazine, Edition No. 3, International, "The Latest on Industrial Fish Processing" 1979, 103 pgs.

Office Action-Final for U.S. Appl. No. 11/908,891; Filing Date: Sep. 17, 2007; First Named Inventor: David J. Winsness; Mailing Date: Dec. 22, 2010.

Defendants', Bushmills Ethanol, Inc., Chippewa Valley Ethanol Company, LLLP, Heartland Corn Products and United Wisconsin Grain Producers LLC, Preliminary Invalidity Contentions; filed in the United States District Court; Southern District of Indiana; Indianapolis Division; in Re: Method of Processing Ethanol Byproducts and Related Subsystems (858) Patent Litigation; Master Case No. 1:10-ml-02181-LJM-DML: dated Jan. 24, 2011; 23 pages.

Flottweg Separation Technology, Inc.'s Preliminary Invalidity Contentions; In Re: Method of Processing Ethanol Byproducts and Related Subsystems ('858') Patent Litigation; Master Case No. 1:10-MLO-02181-LJM-DML; Associated Case No. 1:10-cv-8010-LJM-DML; dated Jan. 24, 2011; 12 pages.

Preliminary Invalidity Contentions of Defendants ICM, Inc., Cardinal Ethanol, LLC, Big River Resoruces Galva, LLC, Big River Resources West Burlington, LLC and Lincolnland Agri-Energy, LLC; filed in the United States District Court; Southern District of Indiana; Indianapolis Division; In Re: Method for Processing Ethanol Byproducts and Related Subsystems ('858) Patent Litigation; 1:10-ml-02181-LJM-DML; dated Jan. 24, 2011, 9 pages.

Blue Flint Ethanol, LLC's Preliminary Invalidity Contentions; filed in the United States District Court; Southern District of Indiana; Indianapolis Division; In Re: Method or Processing Ethanol Byproducts and Related Subsystems ('858') Patent Litigation; Case No. 1:10-ml-02181-LJM-DML; Exhibits A-F included, dated Jan. 24, 2011; 77 pages.

Adkins Energy LLC's Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-Dl; Associated Case No. 1:10-cv-08004-LJM-DML; dated Jan. 24, 2011, 19 pp.; Exhibit A, pp. 1-14 and Exhibit B, pp. 1-146.

Al-Corn Clean Fuels' Preliminary Invalidity Contentions; filed in the United States District Court; Southern District of Indiana; Indianapolis Division; In Re: Method of Processing Ethanol Byproducts and Related Subsystems ('858) Patent Litigation; Master Case No. 1:10-ml-02181-LJM-DML; Associated Case No. 1:10-cv-08004-LJM-DML, dated Jan. 24, 2011; pp. 1-16.

GEA Westfalia Separator, Inc. and Ace Ethanol LLC.'s Preliminary Invalidity Contentions, filed in the United States District Court for the Southern District of Indiana; Indianapolis Division; in Re: Method of Processing Ethanol Byproducts and Related Subsystems ('858) Patent Litigation; 1:10-ml-02181-LJM-DML; filed Jan. 24, 2011: 28 pages.

Preliminary Invalidity Contentions by Lincolnway Energy, LLC; filed in the United States District Court, Southern District of Indiana; Indianapolis Division; In re: Method for Processing Ethanol Byproducts and Related Subsystems ('858) Patent Litigation; Master Docket: 1:10-ml-02181-LJM-DML; dated Jan. 24, 2011; 18 pages.

Amaizing Energy Preliminary Invalidity Contention; filed in the United States District Court for the Southern District of Indiana; Indianapolis Division; In Re: Method of Processing Ethanol Byproducts and Related Subsystems ('858) Patent Litigation; Master Case. No. 1:10-m1-02181-LJM-DML; Associated Case No. 1:10-Cv-08001-LJM-DML; dated Jan. 24, 2011; 16 pages.

Iroquois Bio-Energy Company, LLC's Preliminary Invalidity Contentions; filed in the United States District Court for the Southern District of Indiana; Indianapolis Division; In Re: Method for Processing Ethanol Byproducts and Related Subsystems ('858) Patent Litigation; MDL Master Case No. 1:10-m1-02181-LJM-DML; dated Jan. 24, 2011; 25 pages.

Abstract of JP54064683A; published May 24, 1979, 1 page.

Dominguez, H., et al. "Enzymatic pretreatment to enhance oil extraction from fruits and oilseeds: a review", Food Chemistry 49 (1994), pp. 271-286.

Puertollano, et al., "Separation of the Oil and Protein Fractions in Coconut", J. Agr. Food Chem., vol. 18, No. 4, 1970, pp. 579-685.

Rosenthal et al., "Aqueous and enzymatic processes for edible oil extraction", Enzyne Microb. Technol., vol. 19, Nov. 1, 1996, pp. 402-420.

Stanton, W.R., "Fermentation Assisted Byproduct Recovery in the Palm Oil Industry", Agricultural Wastes 6, (1983), pp. 31-63.

Sweeten et al., "Removal and Utilization of Ethanol Stillage Constituents" Energy in Agriculture, 1 (1981-1983), Elsevier Science Publishers B.V.; pp. 331-345.

Digital Copy of a Book provided by Google—Thesis of Winfield, Harriet The oil of maize (*Zea mays*); Library of the University of Wisconsin, New York, 1899; pp. 1-61.

* cited by examiner

METHOD OF PROCESSING ETHANOL BYPRODUCTS AND RELATED SUBSYSTEMS

This application is a continuation of U.S. patent application Ser. No. 11/122,859, filed May 5, 2005, now U.S. Pat. No. 7,601,858 which claims the benefit of U.S. Provisional Patent Application Ser. No. 60/602,050, filed Aug. 17, 2004, the disclosures of which are incorporated herein by reference.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to recovering oil and, more particularly, to recovering oil from a byproduct of the dry milling process used to form ethanol.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using grains such as corn, which are of course renewable resources. At present, approximately sixty-nine "dry milling" plants in the United States produce over two billion gallons of ethanol per year. Additional plants presently under construction are expected to add over four hundred million gallons to this total in an effort to meet the current high demand.

As noted in the foregoing discussion, a popular method of producing ethanol is known as "dry milling," and in the United States is typically practiced using corn. As is well known in the industry, the dry milling process utilizes the starch in the corn or other grain to produce the ethanol through fermentation, and creates a waste stream comprised of byproducts termed "whole stillage" (which may be further separated into products known as distillers wet grains and "thin stillage"). Despite containing valuable oil, this whole stillage has for the most part been treated as waste and used primarily to supplement animal feed (mostly in the form of distillers dried grains with solubles (DDGS), which is created by evaporating the thin stillage, recombining the resulting concentrate or syrup with the distillers wet grains, and drying the product to have a low moisture content; see, e.g., U.S. Pat. Nos. 5,662,810 and 5,958,233, the disclosures of which are incorporated herein by reference).

Efforts to recover the valuable oil from this byproduct have not been successful in terms of efficiency or economy. For example, one approach involves attempting to separate the oil from the thin stillage before the evaporation stage, such as using a centrifuge. However, spinning the thin stillage at this stage does not produce usable oil, but rather merely creates an undesirable emulsion phase requiring further processing. Moreover, the volume of thin stillage present is generally 2 to 10 times greater than the syrup, which requires considerable capital to purchase the number of centrifuges required. Together, these obstacles make attempts to recover oil from thin stillage highly inefficient and uneconomical.

U.S. Pat. No. 5,250,182 (the disclosure of which is incorporated herein by reference) describes the use of filters for removing substantially all solids and recovering lactic acid and glycerol from the thin stillage without the need for evaporation. Despite eliminating a step in the conventional process, the proposal results in a more complicated arrangement requiring multiple filtration steps. Wholesale elimination of the evaporator in the vast majority of existing plants is also unlikely and otherwise uneconomical. Filters, and especially the microfiltration and ultrafiltration types proposed in this patent, are also susceptible to frequent plugging and thus disadvantageously increase the operating cost. For these reasons, the filtration process proposed in this patent has not gained widespread commercial acceptance.

Accordingly, a need exists for a more efficient and economical manner of recovering oil from a byproduct containing it, such as thin stillage created during the dry milling process used to produce ethanol.

SUMMARY OF THE INVENTION

In accordance with one aspect of the invention, a method of processing a concentrated byproduct of a dry milling process for producing ethanol, such as by using corn, is disclosed. In its most basic form, the method comprises recovering oil from the concentrated byproduct.

In one embodiment, the byproduct comprises thin stillage, and the method includes the step of evaporating the thin stillage to form a concentrate. The recovering step may further comprise separating the oil from the concentrate using a disk stack centrifuge. Preferably, the recovering step comprises: (1) providing the concentrated byproduct at a temperature of between about 150 and 212° F. and, most preferably, at a temperature of about 180° F.; and/or (2) providing the concentrated byproduct having a pH of between about 3 and 6 and, most preferably, between about 3.5 and 4.5. Additionally, it is preferred that the concentrated byproduct have a moisture content greater than 15% by weight, more preferably a moisture content greater than 50% and less than 90% and, most preferably, a moisture content between about 60-85%. The step of recovering the oil from the concentrated byproduct produces syrup, and the method may further include the step of recovering oil from the syrup.

In accordance with another aspect of the invention, a more specific method of processing concentrated thin stillage created by a dry milling process for producing ethanol, such as from corn, is disclosed. The method comprises recovering oil from the concentrated thin stillage having a moisture content of less than about 90% by weight.

In one embodiment, the recovering step comprises separating the oil from the concentrate using a disk stack centrifuge. The method may further include the step of drying the concentrate after the removing step.

In accordance with still another aspect of the invention, a method of recovering oil from thin stillage is disclosed. The method comprises evaporating the thin stillage to create a concentrate having a moisture content of greater than 15% by weight and less than about 90% by weight. Oil is then recovered by centrifuging the concentrate, preferably using a disk stack centrifuge.

In accordance with yet another aspect of the invention, a method of processing whole stillage is disclosed. The method comprises recovering thin stillage including oil and solids from the whole stillage, concentrating the thin stillage including the solids, and recovering oil from the concentrate.

In one embodiment, the step of recovering the thin stillage includes using a separator selected from the group consisting of a press, extruder, a decanter centrifuge, and a screen centrifuge. The concentrating step may comprise processing the thin stillage to a temperature of between about 150 and 212° F., a pH of between about 3 and 6, and a moisture content of less than 90%. The step of recovering oil comprises separating the oil from the concentrate using a centrifuge. The recovering and concentrating steps may be performed in a continuous fashion. The method may further include drying the concentrate after recovering oil.

In accordance with a further aspect of the invention, a subsystem for use in a system for producing ethanol by dry milling and creating thin stillage as a byproduct is disclosed. The subsystem comprises an evaporator for evaporating the thin stillage to form a concentrate, and a centrifuge for receiving the concentrate and recovering oil therefrom. Preferably, the concentrate has a moisture content of less than about 90% by weight, and the centrifuge is a disk stack type.

Still a further aspect of the invention is a subsystem for use in a system for producing ethanol by dry milling and creating thin stillage as a byproduct. The subsystem comprises an evaporator for evaporating the thin stillage to form a concentrate and means for recovering oil from the concentrate. In one embodiment, the recovering means comprises a centrifuge and, most preferably, a disk stack centrifuge.

Yet a further aspect of the invention is the combination of a concentrate formed from thin stillage including oil and a centrifuge for removing at least a portion of the oil from the concentrate. Preferably, the concentrate has a moisture content of greater than 15% by weight and less than about 90% by weight, and the centrifuge is a self-cleaning bowl type of disk stack centrifuge, a nozzle bowl disk stack centrifuge, or a horizontal centrifugal decanter

DETAILED DESCRIPTION OF THE INVENTION

In accordance with one aspect of the invention, a method recovers oil from a byproduct resulting from the production of ethanol using a dry milling technique (which is extensively described in the above-referenced '182 patent). The byproduct, known as "thin stillage," is recovered by separating the distillers wet grain from the "whole stillage" leftover after fermentation is complete. As is known in the art, this mechanical separation may be accomplished using a press/extruder, a decanter centrifuge, or a screen centrifuge. Moisture is then removed from the unfiltered thin stillage to create a concentrate or syrup, such as through evaporation. Advantageously, usable oil is then easily recovered from this concentrated form of the byproduct through relatively simple mechanical processing, without the prior need for multiple stages of filtration or other expensive and complicated undertakings.

In one embodiment, oil is recovered from the concentrate by passing it through a centrifuge and, in particular, a disk stack centrifuge (and most preferably a self-cleaning bowl type). Preferably, the concentrate fed to the disk stack centrifuge is at a temperature of between about 150 and 212° F. (and ideally 180° F.) and a pH of between about 3 and 6 (ideally between about 3.5 and 4.5). As a result of the preceding evaporation step, the concentrate has a moisture content of greater than 15% and less than about 90%, more preferably between 30% and about 90%, and ideally about 60-85% by weight. Under these process conditions, the disk stack centrifuge is able to separate the oil in usable form from the concentrate in an efficient and effective manner, despite the relatively high level of solids present (which may be recovered from the centrifuge in a continuous or intermittent fashion, depending on the particular process conditions).

Besides creating usable oil, the concentrate or syrup recovered from the disk stack centrifuge is considered more valuable. This is because the post-evaporation processing to recover or remove the oil improves the efficiency of the drying process used on the combined concentrate syrup and distillers wet grains. A stable, flowable product for supplementing animal feed results, which thus further complements the value of the oil recovered.

Two examples are presented below to demonstrate the efficacy of the above-described method.

EXAMPLE 1

Figure 1:
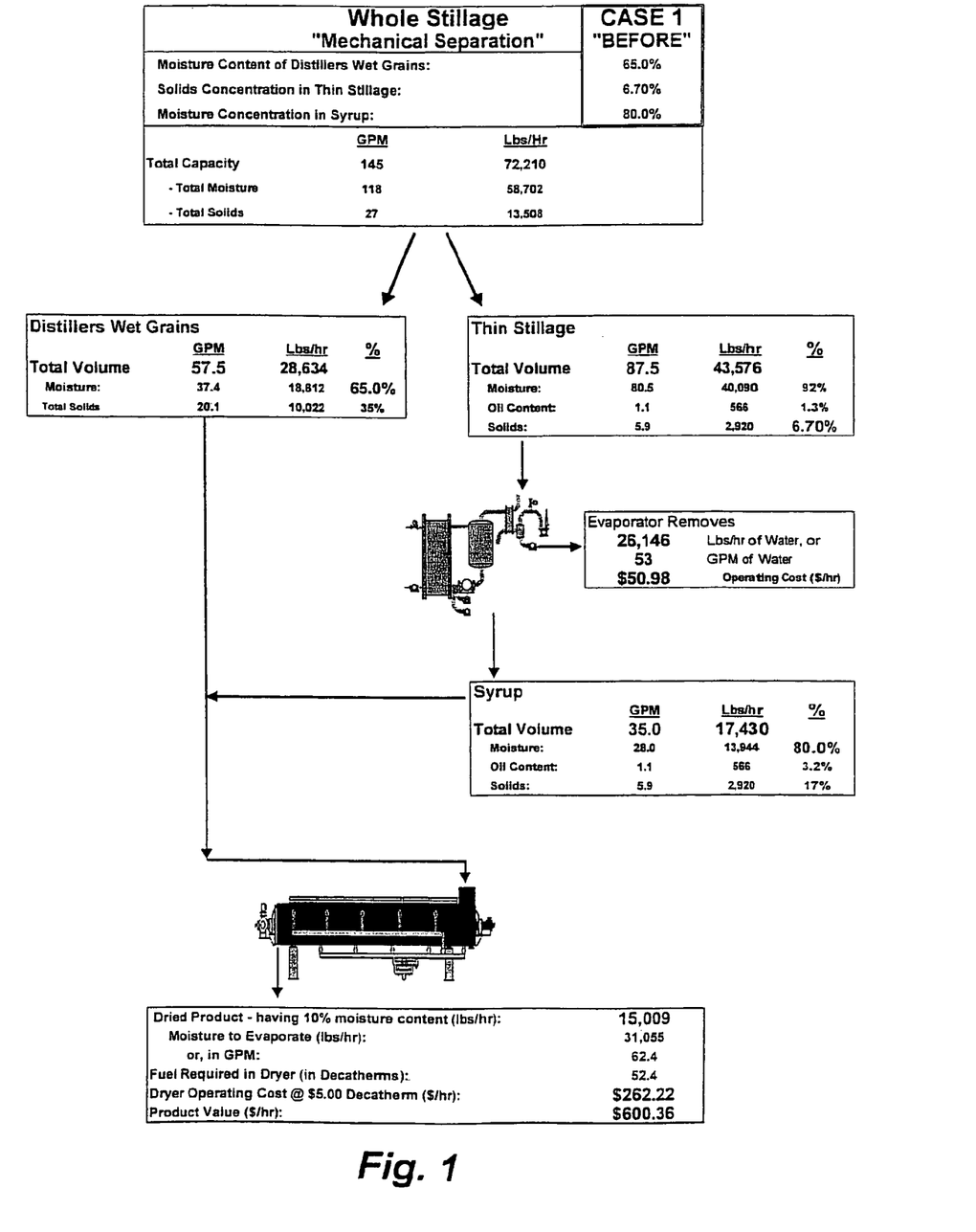
FIG. 1 is a partially schematic flow chart illustrating the processing of co-products formed during the ethanol extraction process.
Figure 2:
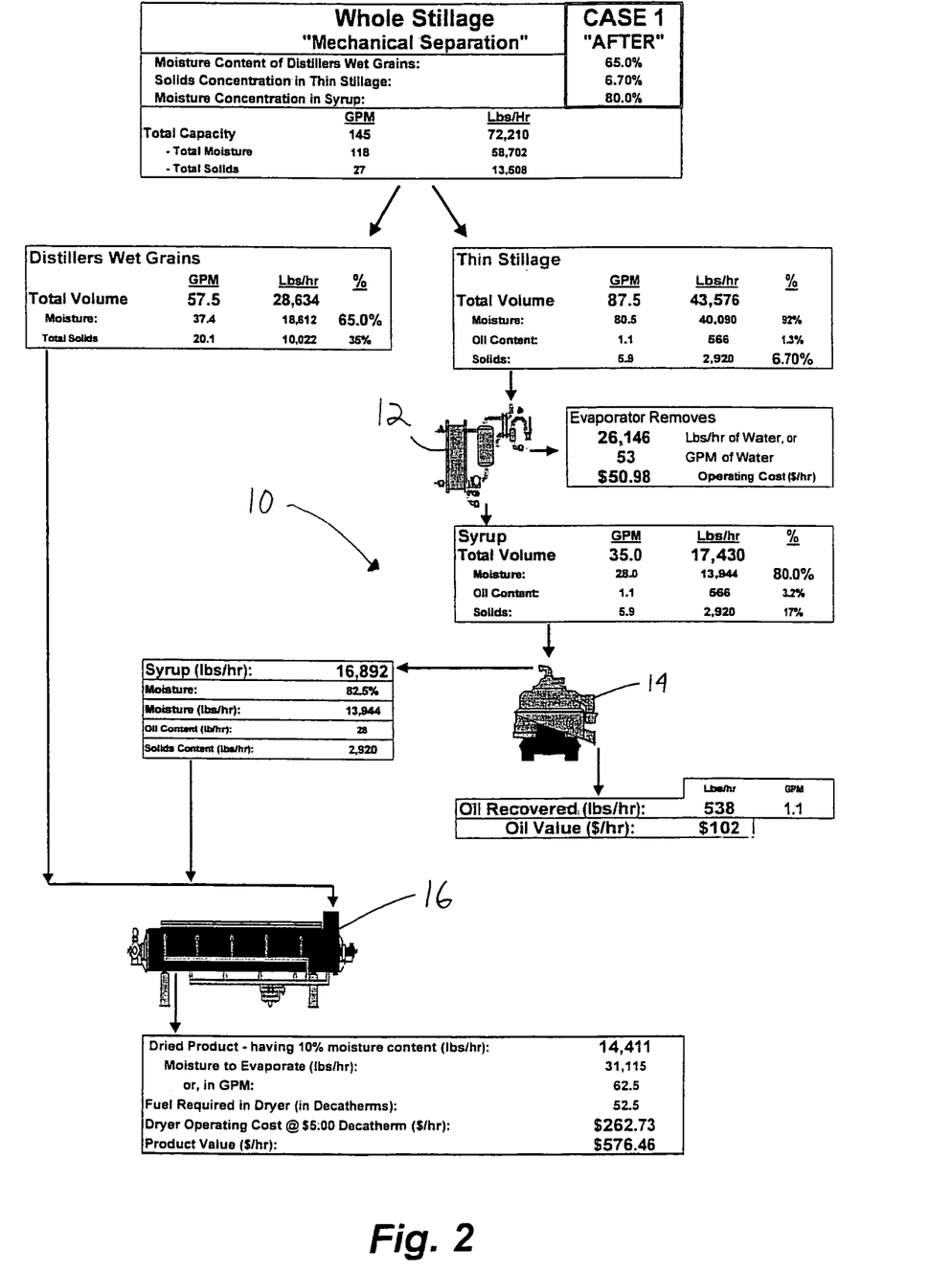
FIG. 2 is a partially schematic flow chart illustrating the recovery of oil from a syrup formed by evaporating the thin stillage.

Reference is made to FIGS. 1 and 2 to illustrate schematically a first example demonstrating the efficacy of the present method. FIG. 1 represents one technique for processing whole stillage resulting from dry milling corn to create distillers dried grains with solubles. The whole stillage leftover after deriving the ethanol is mechanically separated into distillers wet grains (approx. 35% solids) and thin stillage (approx. 6.7% solids), such as by using a centrifugal decanter. The thin stillage is then introduced to an evaporator to create a syrup having a moisture content of approximately 80% by weight and about 17% solids by weight. The syrup is then recombined with the distillers wet grains, introduced to a drum dryer, and dried to reduce the overall moisture content to approximately 10% by weight. An estimated total value of the resulting distillers dried grains with solubles is $600.36 per hour.

FIG. 2 represents the inventive method and a related subsystem 10 for implementing it. Initial processing of the whole stillage is done in the same fashion, and the mechanically separated thin stillage is delivered to the evaporator 12 forming part of the subsystem 10. The resulting concentrate or syrup having a moisture content of approximately 80% by weight and a solids content of approximately 17% by weight is delivered to a disk stack centrifuge 14, and preferably a "solids ejecting" one, such as an Alfa Laval Model No. AFPX510, AFPX513, or AFPX617 or equivalent device. At an infeed rate of approximately 35 gallons per minute, this centrifuge 14 recovers usable oil at a rate of 538 pounds per hour and produces syrup having a having a moisture content of 82.5% by weight, but with far less oil in view of the preceding recovery step.

Recombining the syrup (which is substantially free of oil) from the centrifuge 14 with the distillers wet grains and drying in a drum dryer 16 to a moisture content of 10% by weight results in a product having a value of $576.46 per hour. However, the 538 pounds per hour of oil recovered has a product value of approximately $102 per hour. Accordingly, the total product value using the inventive method is $678.46 per hour, which is approximately 12% greater than the $600.36 per hour product value resulting from use of the conventional set-up shown in FIG. 1. Moreover, removal of the majority of the oil before the drying step makes the process more efficient, and results in an estimated energy savings of approximately 10%, or $26.27 per hour. As a result, product value per hour ($678.46) less the estimated dryer operating cost ($236.46 per hour with the 10% savings) and less the estimated evaporator operating cost ($50.98 per hour) is about $391.02 per hour.

EXAMPLE 2

Figure 3:
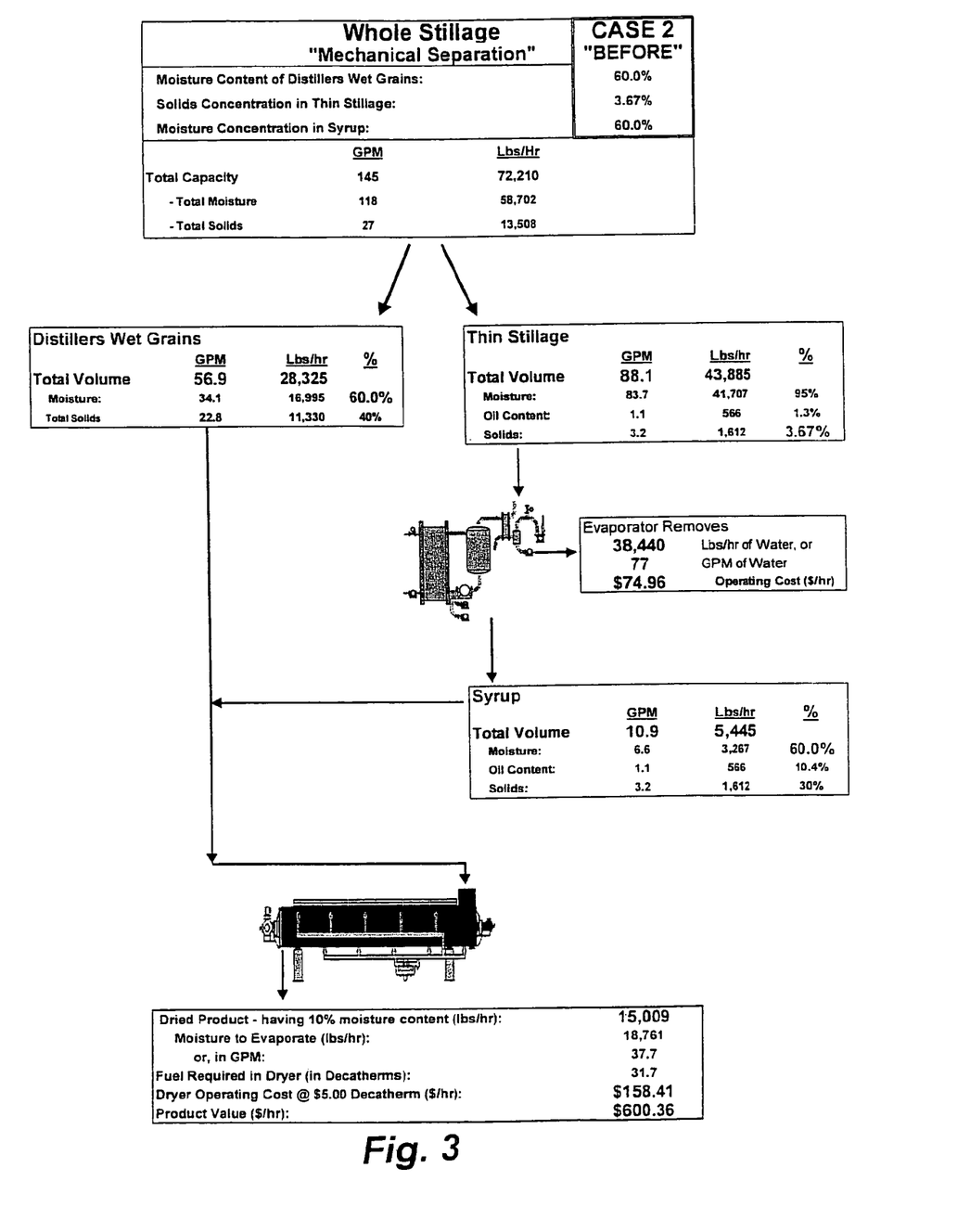
FIG. 3 is a schematic view similar to FIG. 1.
Figure 4:
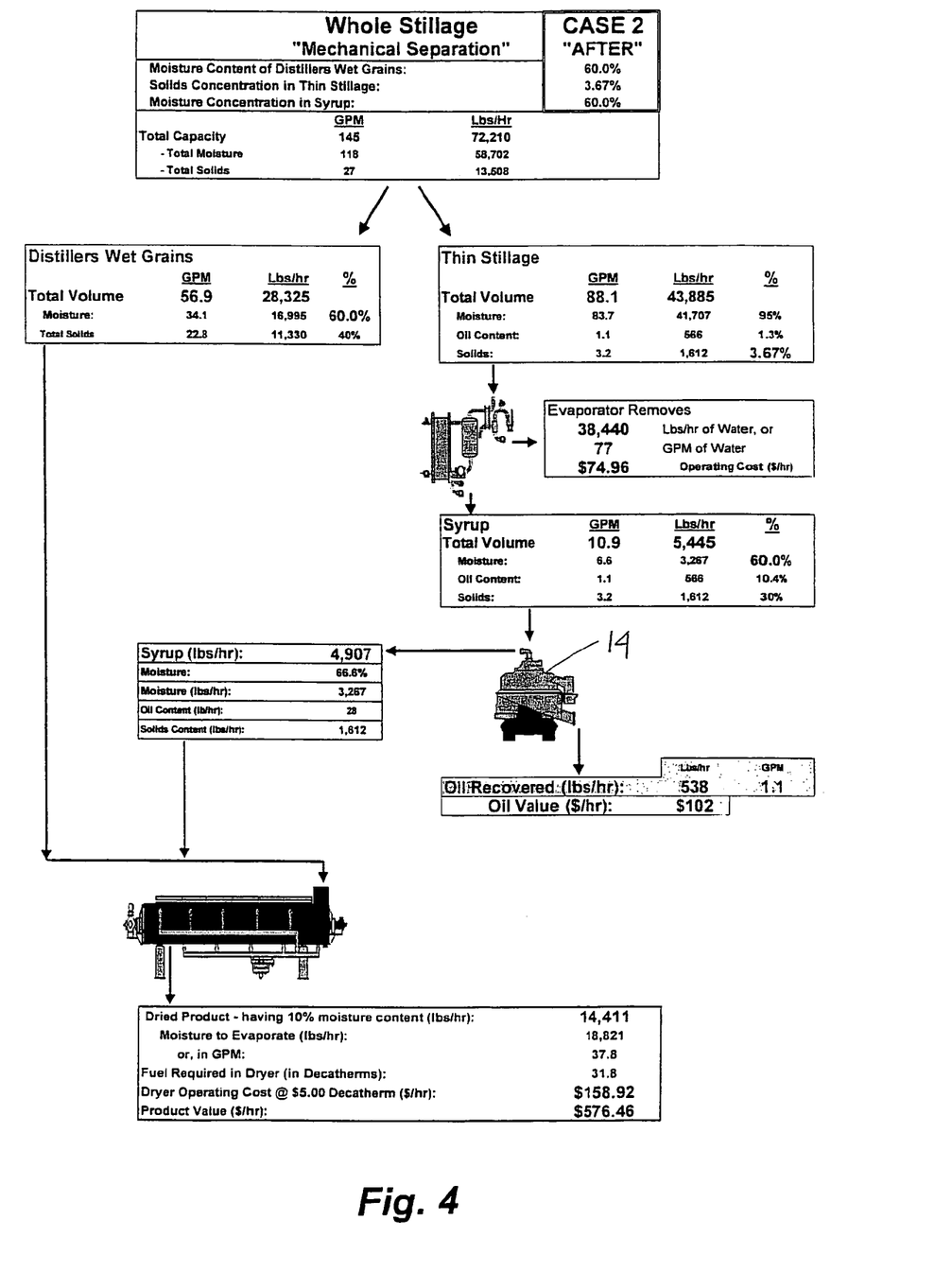
FIG. 4 is a schematic view similar to FIG. 2.

Reference is made to FIGS. 3 and 4, which illustrate a prophetic comparison between one processing method and the inventive method. The set-up is essentially the same as shown in FIGS. 1 and 2, but a more effective centrifugal decanter is used than the one used in Example 1. As a result, the syrup introduced to the disk stack centrifuge 14 would have a moisture content estimated at 60% by weight. While this does not impact the product value figures, the syrup from the centrifuge 14 has a moisture content of only 66.6% by weight, as compared to 82.5% by weight in Example 1. As a result, the cost per hour of drying this syrup when combined with the distillers wet grains to achieve an end product having a moisture content of less than 10% is only $158.92, or approximately 40% less. Assuming a savings in dryer efficiency of 10%, the product value per hour ($678.46) less the estimated dryer operating cost ($143.03 per hour) and less the estimated evaporator operating cost ($74.96 per hour) is $460.46 per hour. This represents an approximate 15% increase over the corresponding value calculated for Example 1.

As should be appreciated, the above-described method and subsystem of the preferred embodiment essentially require the addition of a centrifuge downstream of the evaporator in the conventional system for processing thin stillage (which centrifuge may thus be considered a "means for" recovering oil from thin stillage). Accordingly, instructions on how to implement the above-described method (including the optimum process variables) may be provided along with a centrifuge for use in an ethanol plant for forming the novel subsystem 10 disclosed herein. Such instructions result in the most efficient implementation of the method, as compared to the situation where the scientists or engineers at the plant must experiment with the centrifuge to determine the optimum process conditions required to achieve a favorable result.

The foregoing description provides illustration of the inventive concepts. The descriptions are not intended to be exhaustive or to limit the disclosed invention to the precise form disclosed. Modifications or variations are also possible in light of the above teachings. For example, the syrup recovered from the centrifuge may be evaporated and processed again in a further effort to recover oil before drying. Moreover, in addition to a self-cleaning bowl type of disk stack centrifuge, a nozzle bowl disk stack centrifuge would work as a means for recovering oil from the concentrate, as would a horizontal centrifugal decanter (which may be especially beneficial when the moisture content of the concentrate is less than 50% by weight) or other like devices for separating oil from a substance including suspended solids. Moreover, besides corn, the present invention may have utility with any other grain used in a dry milling process for producing ethanol, such as for example, milo. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A method of recovering oil from thin stillage; the method consisting essentially of, in sequence:
    evaporating water from the thin stillage to form a thin stillage concentrate, wherein the thin stillage concentrate has a moisture content of greater than 30% and less than 90% by weight before the recovering step;
    mechanically processing the thin stillage concentrate to separate oil from the thin stillage concentrate; and
    recovering the separated oil.

2. The method of claim 1, wherein the thin stillage concentrate has a moisture content of greater than 60% and less than 85% by weight before the recovering step.

3. The method of claim 1, wherein the thin stillage concentrate has a pH of between about 3 and 6.

4. The method of claim 1, wherein the thin stillage concentrate has a pH of between about 3.5 and 4.5.

5. The method of claim 1, wherein mechanically processing further comprises heating the thin stillage concentrate to a temperature between 150° F. and 212° F.

6. The method of claim 1, wherein mechanically processing further comprises heating the thin stillage concentrate to a temperature between 150° F. and 212° F. and a pH between 3 and 6.

7. A method of processing whole stillage, comprising, in sequence:
    separating distiller wet grains and thin stillage from the whole stillage, the thin stillage including oil and solids;
    concentrating the thin stillage including the solids to form a concentrate having a moisture content of greater than 30% and less than 90% by weight; and
    disc stack centrifuging oil from the thin stillage concentrate to form a substantially oil free concentrate.

8. The method of claim 7, wherein the concentrating step comprises processing the thin stillage a pH of between about 3 and 6, and a moisture content of less than 90%.

9. The method of claim 7, wherein the recovering and concentrating steps are performed in a continuous fashion.

10. The method of claim 7, further including the step of drying the concentrate after the step of recovering the oil.

11. The method of recovering oil from thin stillage of claim 1, wherein mechanically processing comprises disc stack centrifuging the thin stillage concentrate.

* * * * *